US012405771B2

(12) United States Patent
Rodriguez-Velasquez (10) Patent No.: US 12,405,771 B2
(45) Date of Patent: Sep. 2, 2025

(54) SYSTEM AND METHOD FOR DETERMINING PHYSICAL CODING BLOCK ORIENTATION (71) Applicant: Adrian Andres Rodriguez-Velasquez, San Jose, CA (US)

(72) Inventor: Adrian Andres Rodriguez-Velasquez, San Jose, CA (US)

(*) Notice: Subject to any disclaimer, the term of this patent is extended or adjusted under 35 U.S.C. 154(b) by 358 days.

(21) Appl. No.: 18/298,627

(22) Filed: Apr. 11, 2023

(65) Prior Publication Data
US 2023/0325155 A1 Oct. 12, 2023

Related U.S. Application Data (60) Provisional application No. 63/380,821, filed on Oct. 25, 2022, provisional application No. 63/362,870, filed on Apr. 12, 2022.

(51) Int. Cl.
H04N 19/44 (2014.01)
G06F 8/34 (2018.01)
G06T 7/70 (2017.01)
G06V 10/20 (2022.01)
G07D 7/005 (2016.01)

(52) U.S. Cl.
CPC ............. G06F 8/34 (2013.01); G06T 7/70 (2017.01); G06V 10/255 (2022.01)

(58) Field of Classification Search
CPC ........ G06F 8/61; G06F 8/453; B60R 16/0231
See application file for complete search history.

(56) References Cited

U.S. PATENT DOCUMENTS

2014/0112506 A1* 4/2014 Hopkins ............ H04N 21/4223 381/306
2016/0335917 A1* 11/2016 Lydecker ................ G06F 3/167

OTHER PUBLICATIONS

Ghidini et al. "Developing Apps for Visually Impaired People: Lessons Learned from Practice" (Year: 2016).*
Tepelea et al. "Smartphone application to assist visually impaired people" (Year: 2017).*
Torres-Gil et al. "Applications of Virtual Reality for Visually Impaired People" Issue 2, vol. 9, Feb. 2010 (Year: 2010).*

* cited by examiner

Primary Examiner — S. Sough
Assistant Examiner — Mohammad H Kabir
(74) Attorney, Agent, or Firm — Venable LLP; Ryan T. Ward (57) ABSTRACT Systems and methods for determining physical coding block orientation, and using that orientation to generate computer code based on that orientation. An exemplary method executed by a system can include: capturing, via at least one camera, an image, the image comprising a picture of a programming surface with at least two coding blocks located on the programming surface. The system can then identify an orientation of the at least two coding blocks based on the image, and identify at least one tactile symbol of each coding block within the at least two coding blocks based on the image, resulting in detected tactile symbols. The system can then generate computer programming code based on the orientation and the detected tactile symbols.

10 Claims, 10 Drawing Sheets

SYSTEM AND METHOD FOR DETERMINING PHYSICAL CODING BLOCK ORIENTATION

PRIORITY

This application claims priority to U.S. provisional patent application No. 63/362,870, filed Apr. 12, 2022, and U.S. provisional patent application No. 63/380,821, filed Oct. 25, 2022. The contents of both provisional patent applications are incorporated herein in their entirety.

BACKGROUND

1. Technical Field

The present disclosure relates to software development, and more specifically to using physical blocks to write a computer program.

2. Introduction

Computer programming is an iterative process in which a programmer designs an executable computer program. Programming can involve tasks such as analysis, generating algorithms, profiling algorithms' accuracy and resource consumption, and the implementation of algorithms (usually in a chosen programming language, commonly referred to as coding). These tasks generally take place using a computer display, however for a visually challenged individual other mechanisms may be required.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: capturing, via at least one camera, an image, the image comprising a picture of a programming surface with at least two coding blocks located on the programming surface; identifying, via at least one processor, an orientation of the at least two coding blocks based on the image; identifying, via the at least one processor, at least one tactile symbol of each coding block within the at least two coding blocks based on the image, resulting in detected tactile symbols; and generating, via the at least one processor, computer programming code based on the orientation and the detected tactile symbols.

A system configured to perform the concepts disclosed herein can include: at least one camera; a programming surface; at least two coding blocks, each coding block within the at least two coding blocks having a coupling mechanism which allows the coding block to become coupled to another coding block, and each coding block within the at least two coding blocks comprising at least one tactile symbol on at least one face of the each coding block; at least one processor; and a non-transitory computer-readable storage medium having instructions stored which, when executed by the at least one processor, cause the at least one processor to perform operations comprising: capturing, via the at least one camera, an image, the image comprising a picture of the programming surface with the at least two coding blocks located on the programming surface; identifying an orientation of the at least two coding blocks based on the image; identifying the at least one tactile symbol of the each coding block within the at least two coding blocks based on the image, resulting in detected tactile symbols; and generating computer programming code based on the orientation and the detected tactile symbols.

BRIEF DESCRIPTION OF THE DRAWINGS

a perspective view of the blocks described herein.

DETAILED DESCRIPTION

Various embodiments of the disclosure are described in detail below. While specific implementations are described, this is done for illustration purposes only. Other components and configurations may be used without parting from the spirit and scope of the disclosure.

Systems configured as disclosed herein can use one or more sensors such as cameras, LIDAR (Light Detection and Ranging), sonar, radar, and/or others, to capture the location, orientation, and/or type, of physical blocks being used to assist visually impaired individuals creating a computer program. The blocks can use two-way hook and loop (e.g., VELCRO) fasteners which can be used to couple the blocks together. In other configurations, the blocks can use magnets to couple the blocks together. Systems configured according to this disclosure can use allow a standard camera to capture the (x, y) coordinate of a programming block placed on a programming surface, and additional user-attached information about the block. For example, using the book and loop fasteners (or magnets), the user can add to a block specific textures, symbols, colors, shapes, or other information that can attach to a given face of the cube. The system can then provide an audible update about the additions to the visually impaired user, such that the user can hear an audio configuration of the actions being taken). The different textures, symbols, colors, etc., on the face of a block can provide different instructions to the computer system (e.g., specific coding commands), and when combined with other coding blocks can form complete programs, applications, coding segments, websites, etc.

In addition to a camera capturing images of the physical blocks held together using magnets and/or hook and loop additions, the system can use LIDAR to capture the block's z coordinate—i.e., the blocks altitude, height, and/or distance from the programming surface. Based on the distances between blocks and/or the programming surface, different coding commands can be identified. For example, blocks "A" and "B" may have a different coding interpretation if coupled immediately together than if they are separated. Likewise, block "A" may have a different interpretation if the block is resting on the programming surface than if the block has a height above the programming surface (e.g., if the block is resting on another block, and is therefore resting above the programming surface).

A periodically-refreshing video camera can capture which physical blocks are being used or interacted with, and can capture specific details related to their property, orientation, texture, color, or other characteristics on the face of a block (i.e., on the at least one activity surface of the block). The physical blocks can have different shapes, forms, colors, or structures. They can also have Braille markings, numbers. QR codes, or other types of engravings/markings that uniquely identify a physical block. For example, physical blocks can differ in shape, size, form, color, structure, surface texture, tactile indicia, weight, volume, density, or content depicted thereon.

The face of each different side of the block can be removable, such that the user can exchange the faces and configure blocks to have different engravings/markings which correspond to different coding aspects. For example, in some configurations the face plates can be secured using screws, bolts, or other mechanical securing means. Such mechanical securing can, for example, occur in the corners of each face plate, in the center of each face plate, or in any other location needed by a particular configuration. In other configurations, the faces can be prints, stickers, or other materials which can be attached to a face of the block using adhesive. Such prints, stickers, or other materials can be two dimensional (i.e., a print with all printed material having a single uniform height) or three dimensional (i.e., a print with textures such that some portions of the printed materials have a height different than other portions). Such prints/stickers can be for a single face of the block (such that the user can change a single face by printing a new sticker and adhering it over a previous face's print/sticker, or removing and replacing the previous face's print/sticker). In other configurations, the prints/stickers can be for more than one face of the block (e.g., from two to six faces of the block), such that the user can replace more than one face of the block using a contiguous sticker.

Configurations relying on magnets to couple the physical blocks together can, for example, use a free-rotating magnet sphere alignment mechanism, with each block holding one or more magnets in a manner which allows the magnet to couple with other magnets, while being retained within the block. In some configurations, each block will contain multiple magnets, allowing the blocks to be coupled together in a desired orientation. In some configurations, the magnets are spheres inserted/embedded into the blocks, though in other configurations magnets can have other shapes (such as cubes, prisms, or other three-dimensional shapes). In some configurations, each face of the blocks has corresponding cavities located beneath the face into which magnetic can be inserted, such that when the face plate is secured to the block a portion of an inserted magnet is retained within the cavity of the block, while another portion protrudes out of the face plate.

In some configurations, the magnets being inserted into the block are spherical, and each magnet cavity is slightly (e.g., 0.05 mm) larger than the magnet sphere which will be inserted into the magnet cavity, allowing the magnetic sphere to spin/rotate. In such configurations, a magnetic sphere is inserted into a magnet cavity, then held in place by a "magnet sphere cap" which has holes $1/4^{th}$ to $1/3^{rd}$ the size of the radius of the magnetic sphere inserted into the sphere cavity. This allows the magnets to slightly protrude through the magnet sphere cap, particularly when coupled to other magnets on other cubes.

In some configurations, the cubes can have one or more sphere cavities into which sphere magnets can be placed, causing the block to align (due to magnetic attraction) to the block to which it is being coupled. For instance, if block "A" contains four sphere cavities with magnets inserted therein, and block "B" also contains four sphere cavities with magnets inserted therein, blocks A and B can be coupled together by aligning the magnets of each block together (accounting for polarity of the magnets). If a user does not initially perfectly align the blocks, the magnetic fields from the magnets embedded into blocks A and B will cause the blocks to rotate and align, resulting in aligned, coupled blocks.

In some configurations, the blocks can have four magnet cavities on a given side of the block, for twenty four total magnet cavities. These four magnet cavities can form a square, rectangle, triangle with a center cavity/magnet, or any other configuration on a given block's side. In other configurations the number of magnet cavities can vary. For example, in some configurations there may be six cavities on a given side of a block, formed in two rows of three cavities. The number of magnets on a given side of the block can vary according to the particular needs of a user, and blocks configured as described herein can include any number of magnets on each side of the block (e.g., 2, 3, 4, 5, 6, or more magnets per side). In addition, in some configurations one side of the block may have a first number of magnets (e.g., four) and a different side may have a different number of magnets (e.g., six), such that the different sides of a block are not all using the same number of magnets. This can be useful when, for example, the different sides of the block convey very different coding interpretations.

In some configurations, the positions of the magnet cavities can be particular to a particular type of programming terminology, such that only programming aspects with the same magnetic configurations will couple to the block. For example, a block "Y" may be associated with a particular computer programming function, class, or object, and only blocks representing programming aspects which will work with that particular type of function, class, or object will couple to block Y. Block Y may have, for example, three magnet cavities arranged in a equilateral triangle and a user may be trying to couple a block with four magnet cavities arranged in a square, resulting in the blocks not aligning and not coupling together. By contrast, if the user had a block with three magnet cavities arranged in an equilateral triangle formation, that block would match the magnet formation of block Y and be able to be coupled to it. In some configurations, the different sides of a single block can have a common number of magnet cavities and a common shape formed by the magnet cavities, whereas in other configurations the different sides of a single block can vary in both the number of magnet cavities and/or the shape formed by those cavities.

A computer connected to the video camera can map the physical blocks and their arrangement/orientation into snippets of computer code, which can be processed in real-time. One or more physical blocks can be representative of a software element (e.g., Boolean, conditional, object, function, class, API, GUI, or other element). For example, a square physical block (or the face of a block) can indicate a header of a website. A round physical block (or the face of a block) can be representative of a slider bar on a mobile app. In some embodiments, a physical block can also be representative of one or more actions that a developer typically takes when interacting with software. For example, a triangular physical block on top of a pyramid physical block can be indicative of a delete action. A rhomboid physical block can be representative of a file upload action.

In some embodiments, the disclosed technology can control the position or value of transient avatars, such as every time a piece moves or enters the scene, a new line of code is written, stored, and published (process for construction more so than interaction). In some embodiments, the disclosed technology can avoid reliance on embedded hardware to interpret and write code (e.g., the camera interprets visual features to identify code instructions, rather than any data provided by the blocks themselves). In this way, the disclosed technology could at least partially or completely replicate the functionality of "imperative" form of programming by using a camera instead of individual sensors, where the camera-equipped computing device can act as the "brain" board, and a designated "start" piece defines the program's starting point.

Further, the disclosed technology can then encode the entirety of this sequence, function, or program in a single block. For example, once the user programs (using the blocks) a multi-block piece of code, the system can combine that sequence together and encode a new, different block with that sequence, such that the user can repeat that sequence as needed, rather than needing to rebuild the entire multi-block combination. In this manner the blocks themselves can then be composed to arbitrary degrees of complexity as the computing device is able to track and convey arbitrary orders of complexity. Therefore, the disclosed technology can enable the user to engage directly with spatial data and physical data structures (as opposed to or additional to mere instructions).

In some embodiments, the disclosed technology can allow users to define two or three dimensional layouts for GUI's and other graphical assets, and can be used to tactilely format documents in word processing applications, tables in spreadsheet applications, slides in presentation applications, and other content (e.g., alphanumeric, audio, imagery, video) entry or modification applications.

To further identify the type, location, and/or orientation of the blocks, the blocks can have a custom QR-code-like pattern applied at the bezels of the block. This pattern can convey an identity of the block, as well as an orientation of the block. The pattern for an "If" statement, for example, when the block is a cube can be embedded into the QR-code-like pattern near the edges of the cube. The camera can then determine the orientation of the block with respect to the camera and/or other blocks based on the geometry of the bezel detected by the camera, for example, the bezel-based QR code can enable a camera-computer to extract an accurate coordinate (e.g., x, y) of a given cube.

The bezels can also have a colored "orientation" bit which enables the camera-computer to identify the orientation of the block. For example, each corner of the block could have a different colored orientation bit, such that when the camera captures a picture of the colored orientation bit and any other portion of the block (e.g., the bezel, another orientation bit, the texture/symbol on the face of a block, etc.), the camera-computer can determine the orientation of that block. In some configurations, the bezels can have a portion encoded with identifying and/or orientation information (such as the orientation bit), and another portion which is non-encoded. For example, the corners may have the QR encoded portion which can identify the orientation of the block, while the middle portions of the bezel are decorative, non-encoded portions which can be used to provide a distinct visual indicator. Other portions of the block, such as portions of the face, can have additional pieces of information, such as tactile symbols for blind or visually impaired users.

Users can still use a keyboard. They can define spatial layout regions with the blocks, and then tab through them to add text by tabbing and typing, or touch the block and typing. For example, in some configurations the user may use configure multiple blocks on a table or other programming surface, and using a camera connected to a computer (such as a web-cam, augmented reality (AR) glasses, a cell phone, etc.), the locations and/or orientation of the blocks can be converted into code. The user can then use a keyboard, mouse, or other input device connected to the computer to update or modify the code as needed. In some configurations the resulting code can be a three dimensional (3D) virtual environment, where the locations of the blocks can be converted into locations of features within the 31) virtual environment.

Next, please consider the specific examples illustrated in the figures.

Figure 1:
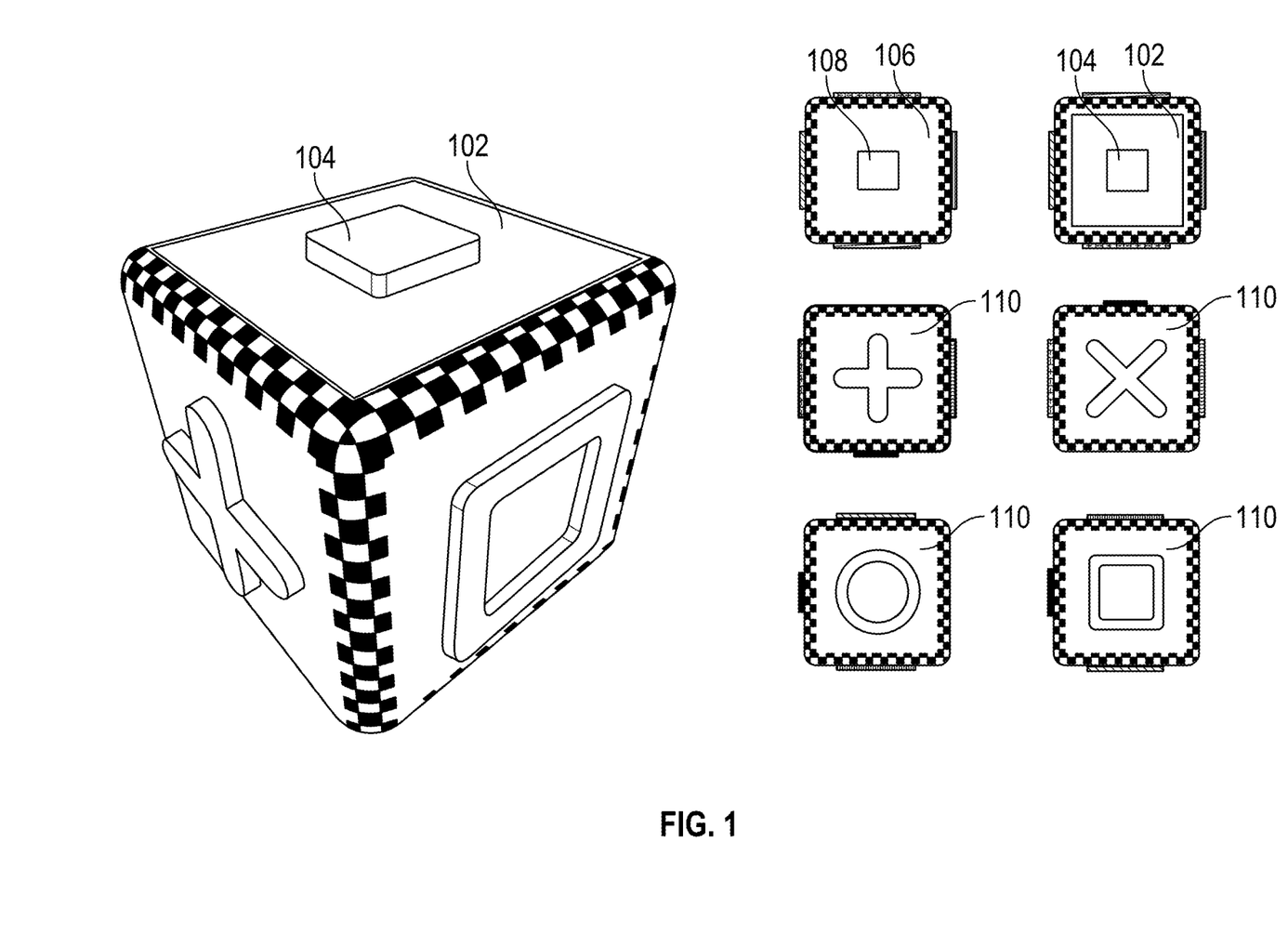
FIG. 1 illustrates an example of a block in both perspective and direct views.

FIG. 1 illustrates an example of a block in both perspective and direct views. On the top 102 of the block is a hook and loop (e.g., VELCRO) connector 104, while on the bottom of the block 106 is a connection point 108 to which the hook and loop connector 104 of another block can connect. Each of the side faces 110 can have a distinct symbol, tactile information, etc., as illustrated here, with each face having a "+", "X", "O", or square symbol.

Figure 2:
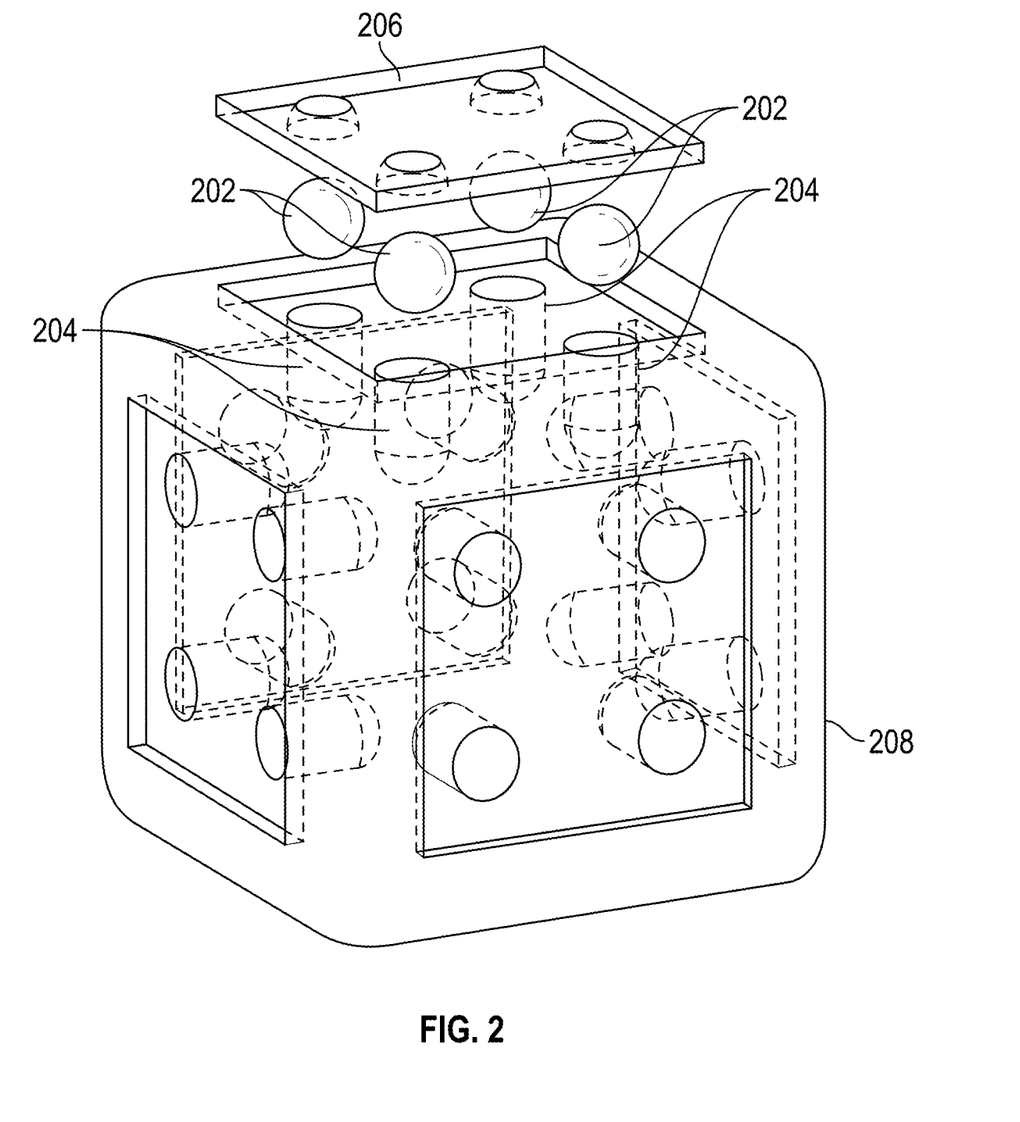
FIG. 2 illustrates a second example of a block type capable of coupling to other blocks.

FIG. 2 illustrates a second example of a block type capable of coupling to other blocks. In this example, the block 208 couples together with other blocks using magnets 202. As illustrated, the block contains magnet cavities 204 which extend into the body of the block 208. The magnets 202 can be inserted into the magnet cavities 204, then covered with a magnet cap 206. The magnet cap 206 can, in some configurations, be the face plate of the block 208, such that the magnet cap 206 has symbols, texture, or other identifying information on the surface which conveys coding information, and which can be identified by the camera-computer system. In other configurations, the magnet cap 206 can securely retain the magnets 202 within the magnet cavities 204, then a distinct face plate can cover the magnet cap 206 and/or any portion of the magnets 202 which extends out of the magnet cap 206.

Figure 3:
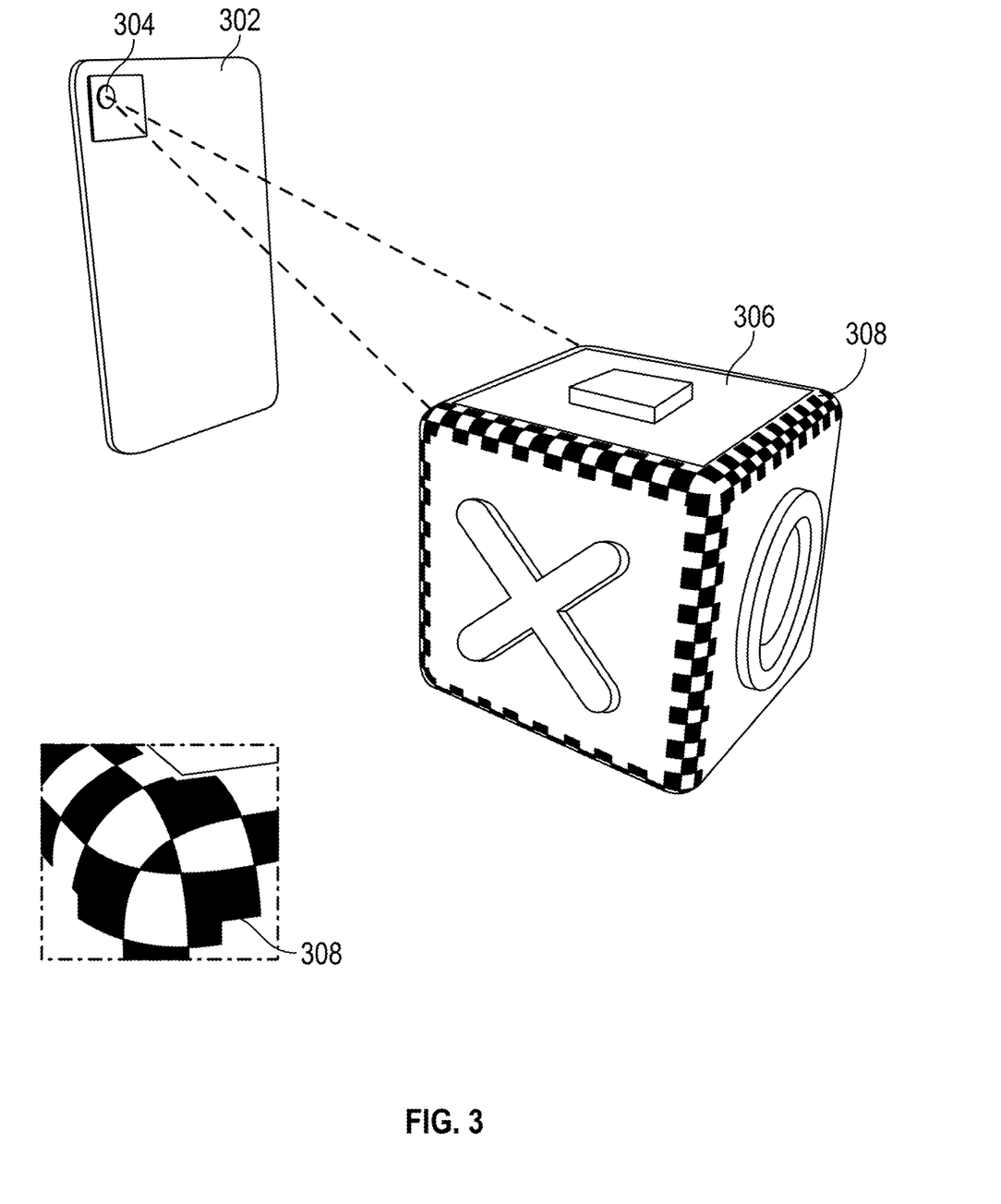
FIG. 3 illustrates an example of a camera being used to capture elements of the beveled code along an edge of a coding cube/block.

FIG. 3 illustrates an example of a camera 304 on a phone 302 being used to capture elements of the beveled code 308 along an edge of a coding cube/block 306. In other examples, the phone 302 could be any other computing system with a camera 302, such as (but not limited to) a laptop, a tablet computer, a different type of smartphone, a computer with a detached camera, etc. Using the beveled code 308, the orientation of the cube 306 can be determined and used by the computer system to identify the corresponding code for the block 306 based on that orientation (and/or its relationship to other blocks and/or the programming surface).

Figure 4:
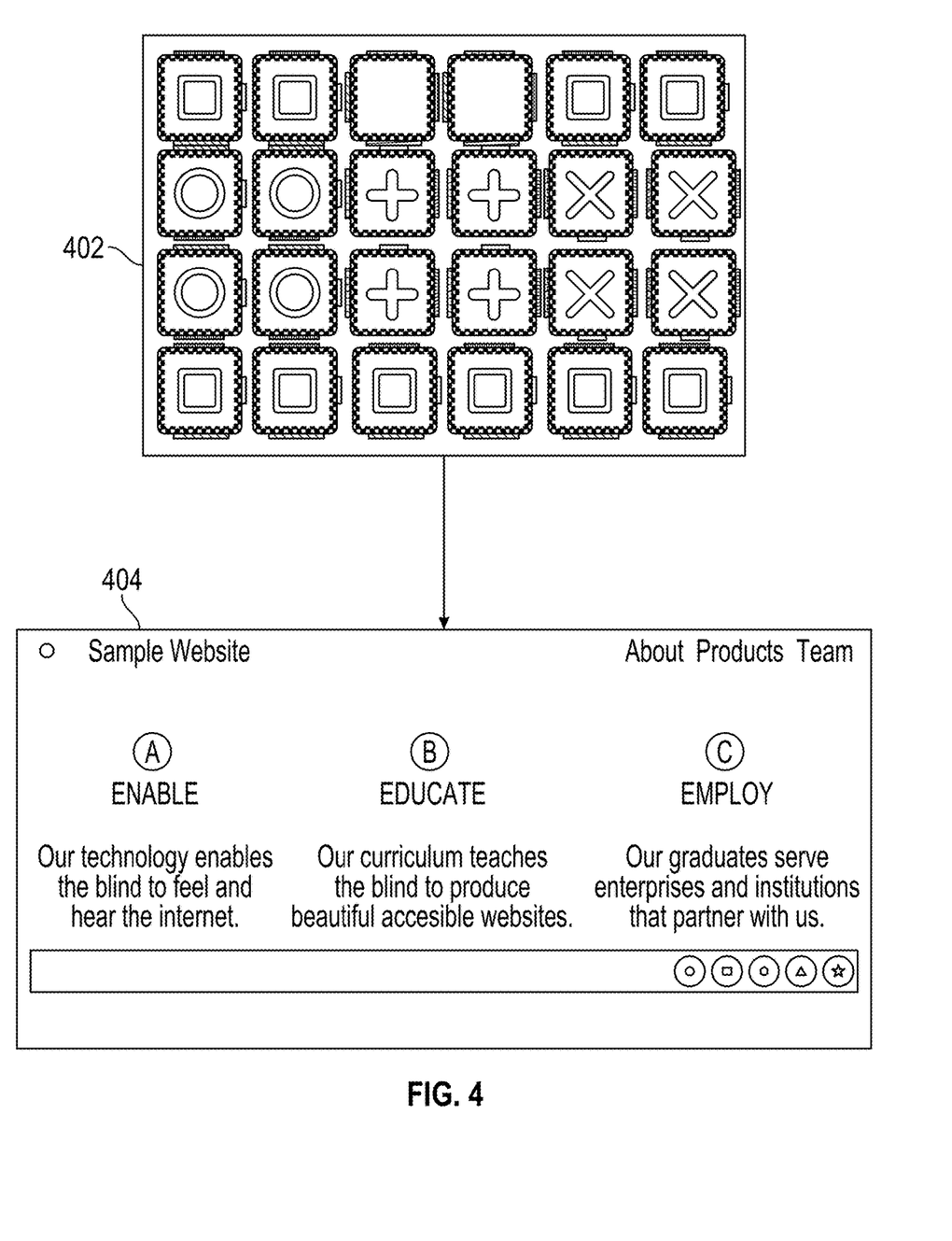
FIG. 4 illustrates an example of block arrangements being used to create a website.

FIG. 4 illustrates an example of block arrangements being used to create a website. In this example, multiple blocks 402 have been configured in a particular pattern such that, when captured by a camera-computer, the camera-computer converts the pattern of blocks 402 is translated into a website 404. In some configurations the user would still use a keyboard or audio commands to enter the text illustrated in the example, whereas in other configurations the blocks 402 themselves would determine the text.

Figure 5:
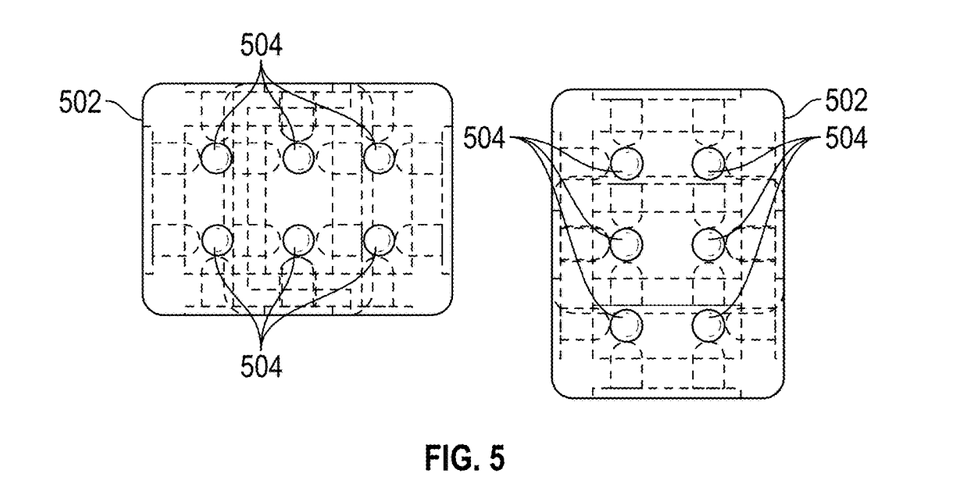
FIG. 5 illustrates a an example of a block with two rows of three magnets.

FIG. 5 illustrates a an example of a block with two rows of three magnets. In this example, the block 502 has two rows of three magnets 504.

Figure 6:
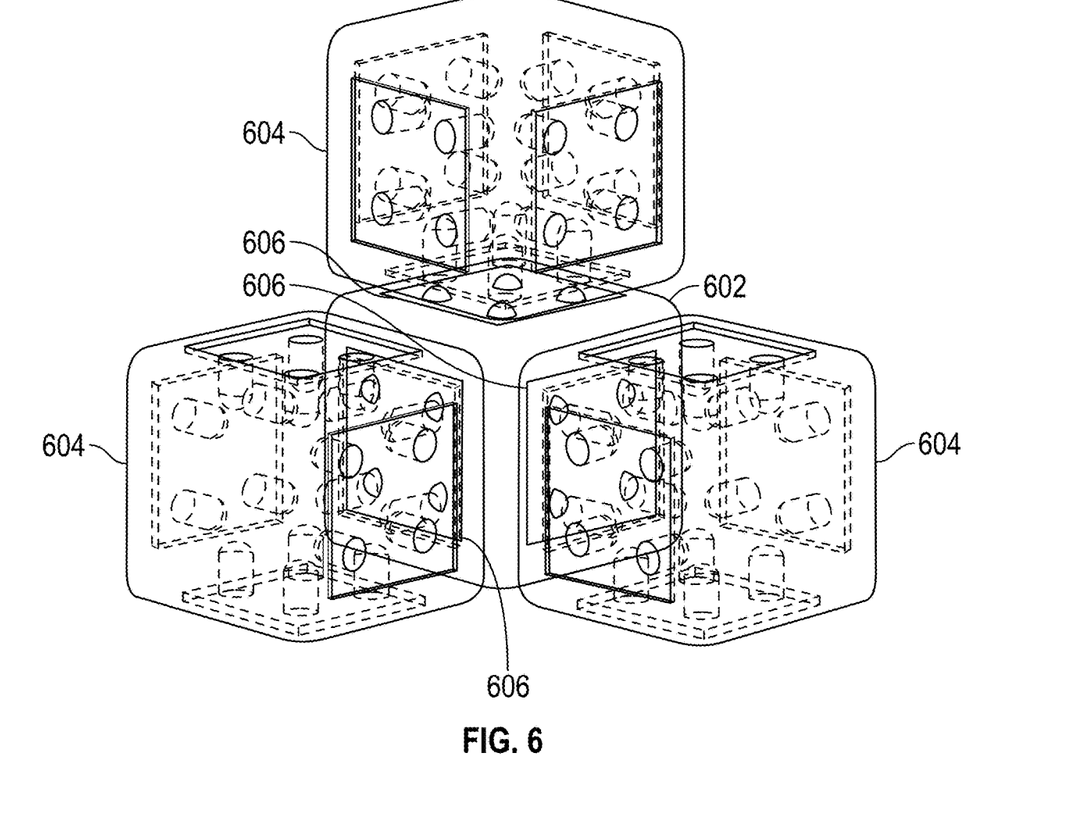
FIG. 6 illustrates an example of coupled blocks.

FIG. 6 illustrates an example of coupled blocks 602, 604. In this example, there is a central block 602, and there are additional blocks 604 which are coupled to the central block 602 using the magnets beneath the face plates 606. As discussed above, the number, shape, or configuration of the magnets, and the degree to which they extend beyond the face plates 606 and/or magnet caps can vary according to need and/or configuration.

Figure 7:
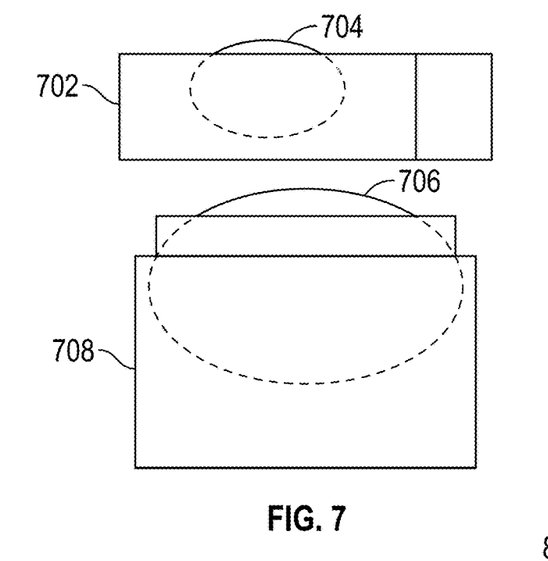
FIG. 7 illustrates examples of spherical magnets protruding from blocks.

FIG. 7 illustrates examples of spherical magnets 704, 706 protruding from blocks 702, 708. In the first example, a spherical magnet 704 is inserted into a block 702 which, when covered, allows a piece of the magnet 704 to partially protrude from the cavity, with the block 702 having a consistent frame such that no ridge or edge to the magnet cover can be perceived. In the second example, the spherical magnet 706 is again inserted into a block 708, however in this example the magnet 706 is partially covered by a magnet cap which does not perfectly match the block 708, such that edge lines of the magnet cap can be identified.

Figure 8:
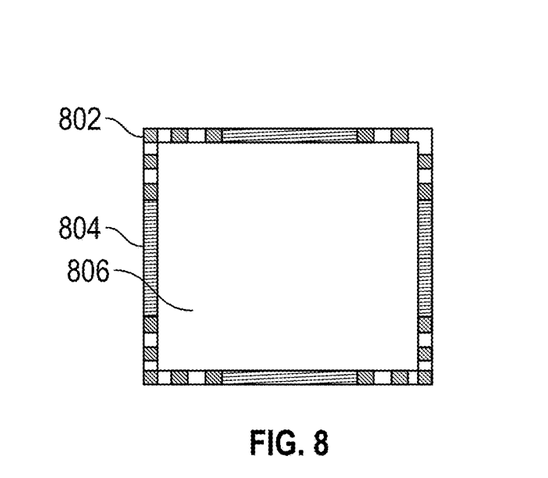
FIG. 8 illustrates an example of a bezel-based QR (quick response) code for the edge of a block.

FIG. 8 illustrates an example of a bezel-based QR (quick response) code for the edge of a block. In this example, the custom, bezel-based QR code enables a camera-computer to extract an accurate orientation (e.g., coordinates) of a given block. In this example, the corners 802 are an encoded area, with each square pixel/square representing a bit of information which can be used to identify aspects of the block such as: the identity of the block (i.e., which individual block is being used), the type of block, the orientation of the block, the location of the block, the size of the block, etc. Portions of the block 804 between the pixelated corners 802 may be blank or may be color coded, allowing each block to have a different visual indicator. Those visual indicators may be used by the camera-computer to identify a type of configuration of the block. The blank interior space 806 (which can be a face of the block depending on the orientation) can hold additional bits of information, or can remain empty to accommodate faces and tactile symbols to assist the visually-impaired users.

Figure 9:
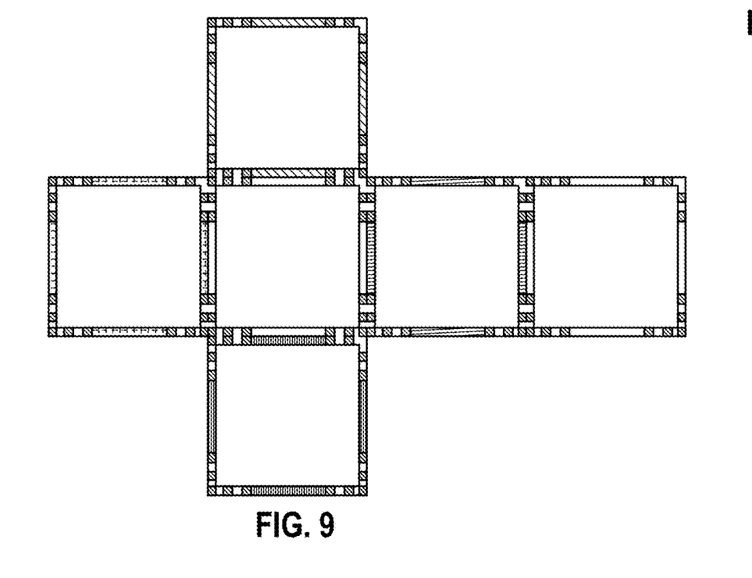
FIG. 9 illustrates an example of an encoded adhesive which can be applied to a block.

FIG. 9 illustrates an example of an encoded adhesive which can be applied to a block. In this example, the encoded adhesive illustrated can be applied to all six faces of a six-sided block, with one of the illustrated faces of the illustrated adhesive being placed on a first side of the block, then the other five faces of the block being covered by the adhesive as the adhesive is wrapped around the block.

Figure 10:
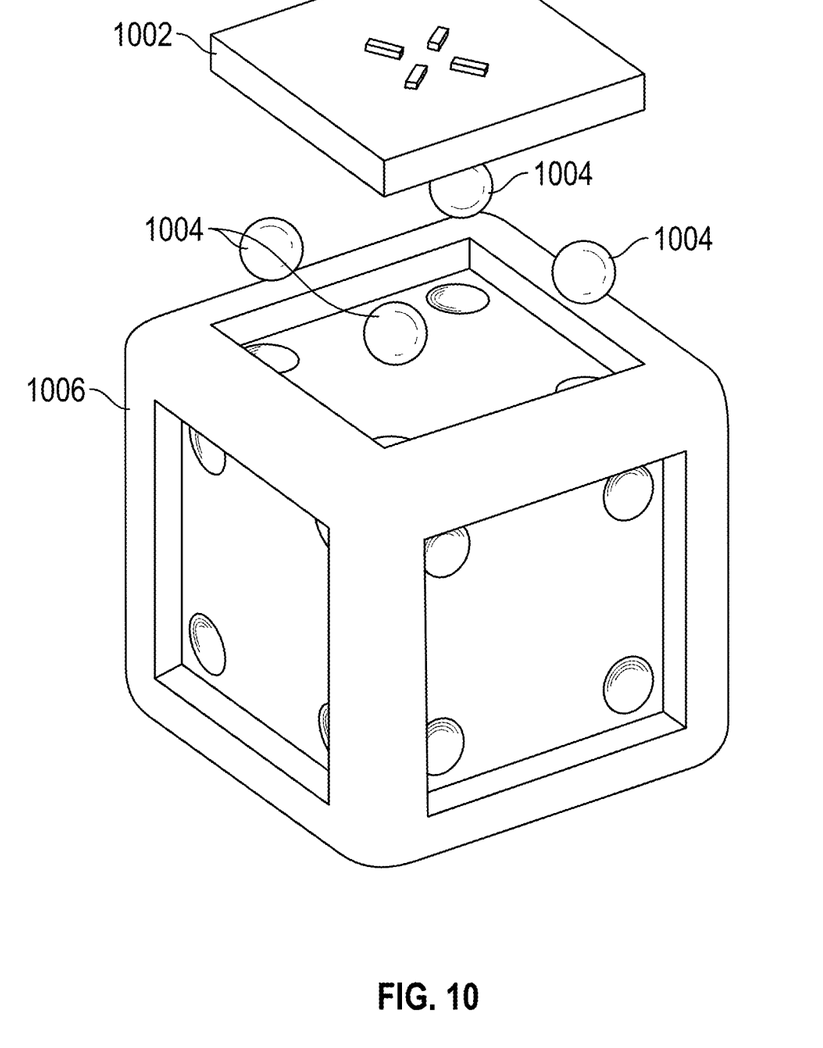
FIG. 10 illustrates an example of a coding block/cube.

FIG. 10 illustrates an example of a coding block/cube. In this example, the block 1006 contains recessed cavities which can hold magnets 1004. The cap 1002 allows the block 1006 to hold a distinct tactile symbol on each face of the block 1006, allowing the camera-computer system to detect and track how the block 1006 is being used, and ultimately to convert the block 1006 to code. The cap 1002 also contains recessed cavities which can hold the magnets 1004, such that when the cap 1002 is fixed to the cube 1006 the magnets 1004 are completely covered by the 1002 (i.e., in this example the magnets 1004 will not protrude through the cap 1002. However, the magnetic fields of the magnets 1004 will extend through the cap 1002, such that the block 1006, magnets 1004, and cap 1002 can couple with other blocks as directed by a programmer. Blocks configured as illustrated in this example can couple together in a flush manner, i.e., without gaps between the blocks.

Figure 11:
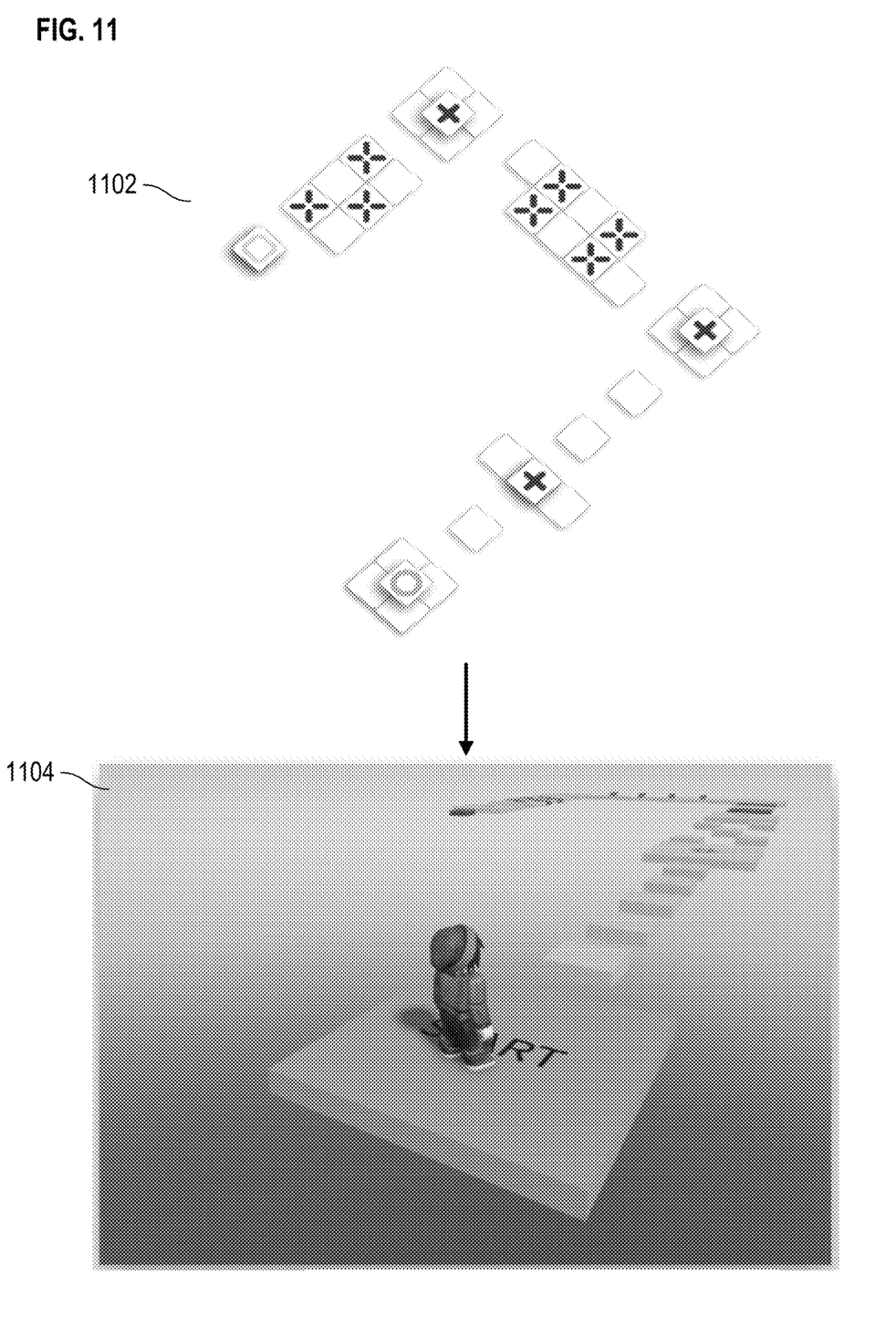
FIG. 11 illustrates an example of multiple coding blocks/cubes being converted into a virtual three dimensional (3D) environment.

FIG. 11 illustrates an example of multiple coding blocks/cubes 1102 being converted into a virtual three dimensional (3D) environment 1104. As illustrated, the locations, orientations, shapes, textures, and combinations of blocks are converted into code for a virtual 3D environment 1104 which can be explored (e.g., in a game or other simulator) by a user.

Figure 12:
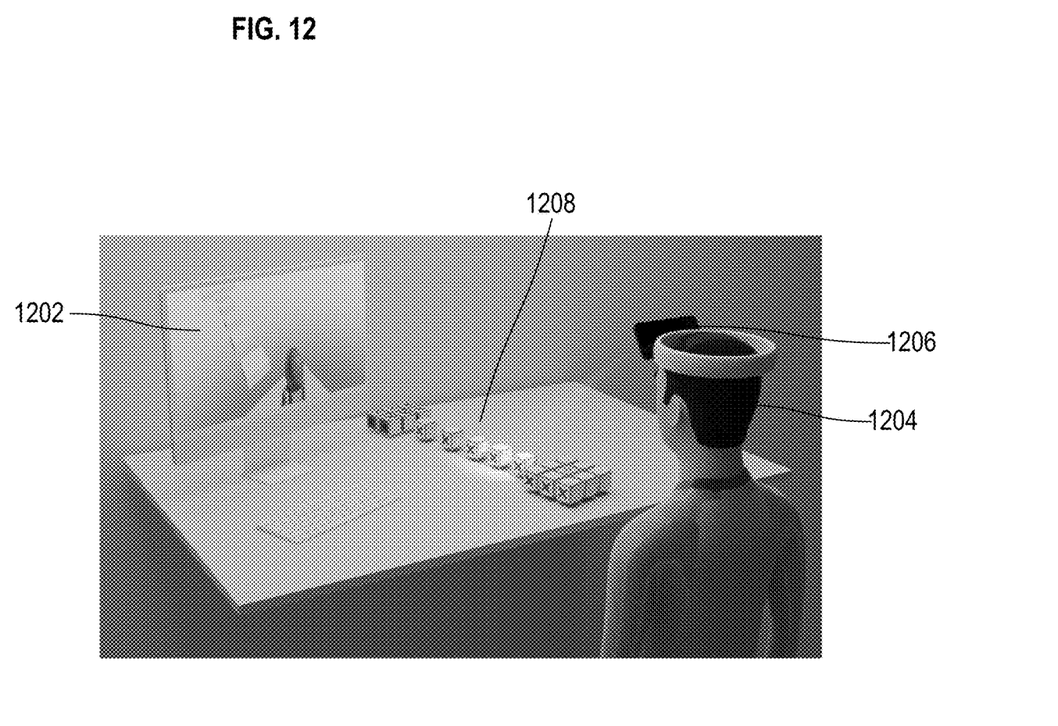
FIG. 12 illustrates an example of a user using a headset to build a virtual 3D environment.

FIG. 12 illustrates an example of a user 1204 using a headset 1206 to build a virtual 3D environment 1202. The exemplary headset 1206 being worn by the user 1204 can, for example, be a smartphone with a camera which is capturing the locations, orientations, textures, colors, etc., of the blocks 1208. In other configurations the headset 1206 can be a pair of smart glasses, or the camera can be part of the computer (e.g., a webcam or otherwise integrated into the computer). In this case, the code generated by the blocks 1208 is a virtual 3D environment 1202, as displayed on the computer monitor. In other configurations, the resulting code may be a website, algorithm, or any other type of coding.

Figure 13:
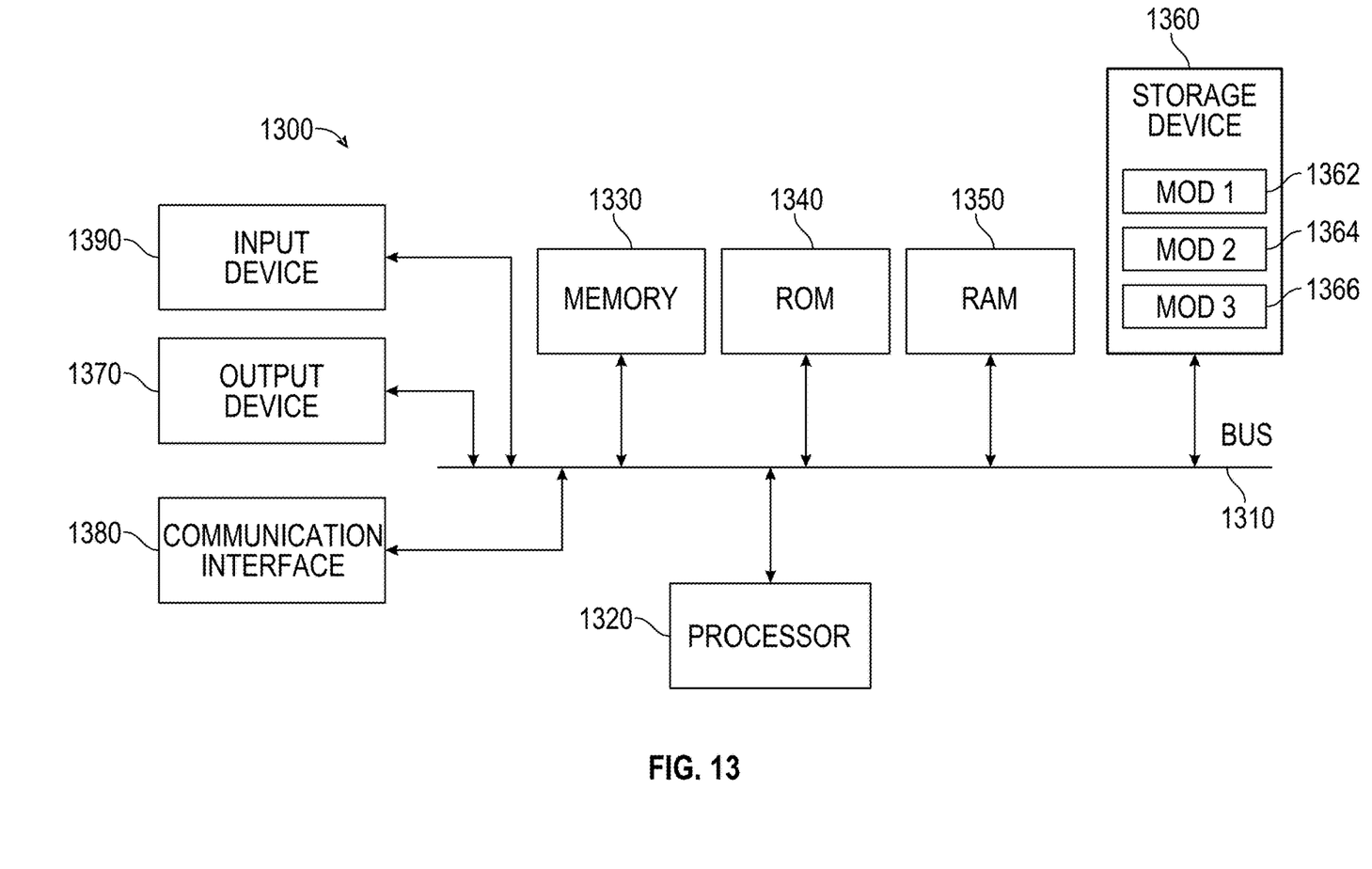
FIG. 13 illustrates an example computer system.

With reference to FIG. 13, an exemplary system includes a general-purpose computing device 1300, including a processing unit (CPU or processor) 1320 and a system bus 1310 that couples various system components including the system memory 1330 such as read-only memory (ROM) 1340 and random-access memory (RAM) 1350 to the processor 1320. The system 1300 can include a cache of high-speed memory connected directly with, in close proximity to, or integrated as part of the processor 1320. The system 1300 copies data from the memory 1330 and/or the storage device 1360 to the cache for quick access by the processor 1320. In this way, the cache provides a performance boost that avoids processor 1320 delays while waiting for data. These and other modules can control or be configured to control the processor 1320 to perform various actions. Other system memory 1330 may be available for use as well. The memory 1330 can include multiple different types of memory with different performance characteristics. It can be appreciated that the disclosure may operate on a computing device 1300 with more than one processor 1320 or on a group or cluster of computing devices networked together to provide greater processing capability. The processor 1320 can include any general-purpose processor and a hardware module or software module, such as module 1 1362, module 2 1364, and module 3 1366 stored in storage device 1360, configured to control the processor 1320 as well as a special-purpose processor where software instructions are incorporated into the actual processor design. The processor 1320 may essentially be a completely self-contained computing system, containing multiple cores or processors, a bus, memory controller, cache, etc. A multi-core processor may be symmetric or asymmetric.

The system bus 1310 may be any of several types of bus structures including a memory bus or memory controller, a peripheral bus, and a local bus using any of a variety of bus architectures. A basic input/output (BIOS) stored in ROM 1340 or the like, may provide the basic routine that helps to transfer information between elements within the computing device 13), such as during start-up. The computing device 1300 further includes storage devices 1360 such as a hard disk drive, a magnetic disk drive, an optical disk drive, tape drive or the like. The storage device 1360 can include software modules 1362, 1364, 1366 for controlling the processor 1320. Other hardware or software modules are contemplated. The storage device 1360 is connected to the system bus 1310 by a drive interface. The drives and the associated computer-readable storage media provide non-volatile storage of computer-readable instructions, data structures, program modules and other data for the computing device 1300. In one aspect, a hardware module that performs a particular function includes the software component stored in a tangible computer-readable storage medium in connection with the necessary hardware components, such as the processor 1320, bus 1310, display 1370, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 1300 is a small, handheld computing device, a desktop computer, or a computer server.

Although the exemplary embodiment described herein employs the hard disk 1360, other types of computer-readable media which can store data that are accessible by a computer, such as magnetic cassettes, flash memory cards, digital versatile disks, cartridges, random access memories (RAMs) 1350, and read-only memory (ROM) 1340, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 13M), an input device 1390 represents any number of input mechanisms, such as a microphone for speech, a touch-sensitive screen for gesture or graphical input, keyboard, mouse, motion input, speech and so forth. An output device 1370 can also be one or more of a number of output mechanisms known to those of skill in the art. In some instances, multimodal systems enable a user to provide multiple types of input to communicate with the computing device 1300. The communications interface 1380 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

I claim:

1. A system comprising:
   at least one camera;
   a programming surface;
   at least two coding blocks, each coding block within the at least two coding blocks having a coupling mechanism which allows the coding block to become coupled to another coding block,
   the coupling mechanism comprising a plurality of magnets wherein the plurality of magnets are retained within magnet cavities located inside of each coding block of the at least two coding blocks,
   wherein the magnet cavities within each coding block of the at least two coding blocks are covered by a face plate, such that the plurality of magnets are not accessible when the face plate of each coding block is coupled to each other coding block,
   wherein the magnet cavities within each coding block of the at least two coding blocks allow the plurality of magnets to partially protrude from each coding block, and
   each coding block within the at least two coding blocks comprising at least one tactile symbol on at least one face of the each coding block;
   at least one processor; and
   a non-transitory computer-readable storage medium having instructions stored which, when executed by the at least one processor, cause the at least one processor to perform operations comprising:
      capturing, via the at least one camera, an image, the image comprising a picture of the programming surface with the at least two coding blocks located on the programming surface;
      identifying an orientation of the at least two coding blocks based on the image;
      identifying the at least one tactile symbol of the each coding block within the at least two coding blocks based on the image, resulting in detected tactile symbols; and
      generating computer programming code based on the orientation and the detected tactile symbols.

2. The system of claim 1, wherein the at least two coding blocks are coupled together using the coupling mechanism.

3. The system of claim 1, wherein the at least two coding blocks further comprise encoding located on bezels of the at least two coding blocks; and wherein the orientation is further based on the encoding.

4. The system of claim 1, wherein the generating of the computer programming code is further based on a relationship between the at least two coding blocks and the programming surface.

5. The system of claim 1, wherein the generating of the computer programming code is further based on a physical relationship between the at least two coding blocks.

6. A method comprising:
  capturing, via at least one camera, an image, the image comprising a picture of a programming surface with at least two coding blocks located on the programming surface, each coding block in the at least two coding blocks having a coupling mechanism which allows the coding block to become coupled to another coding block,
  the coupling mechanism comprising a plurality of magnets wherein the plurality of magnets are retained within magnet cavities located inside of each coding block of the at least two coding blocks,
  wherein the magnet cavities within each coding block of the at least two coding blocks are covered by a face plate, such that the plurality of magnets are not accessible when the face plate of each coding block is coupled to each other coding block,
  wherein the magnet cavities within each coding block of the at least two coding blocks allow the plurality of magnets to partially protrude from each coding block;
  identifying, via at least one processor, an orientation of the at least two coding blocks based on the image;
  identifying, via the at least one processor, at least one tactile symbol of each coding block within the at least two coding blocks based on the image, resulting in detected tactile symbols; and
  generating, via the at least one processor, computer programming code based on the orientation and the detected tactile symbols.

7. The method of claim 6, wherein the at least two coding blocks are coupled together using a coupling mechanism.

8. The method of claim 6, wherein the at least two coding blocks further comprise encoding located on bezels of the at least two coding blocks; and wherein the orientation is further based on the encoding.

9. The method of claim 6, wherein the generating of the computer programming code is further based on a relationship between the at least two coding blocks and the programming surface.

10. The method of claim 6, wherein the generating of the computer programming code is further based on a physical relationship between the at least two coding blocks.

* * * * *